(12) United States Patent
Frederick et al.

(10) Patent No.: US 10,383,201 B1
(45) Date of Patent: Aug. 13, 2019

(54) SMART MESH ELECTRICAL SOCKET

(71) Applicant: Sirqul, Inc., Seattle, WA (US)

(72) Inventors: Robert Frederick, Seattle, WA (US); John Schleppy, Redmond, WA (US); Russell Brian Dodds, Seattle, WA (US); Thang Le, Seattle, WA (US); Justin Jaewook Yu, Bellevue, WA (US); Luis Cifuentes, Seattle, WA (US); Chris Gay, Montlake Terrace, WA (US)

(73) Assignee: Sirqul, Inc., Seattle, WA (US)

(*) Notice: Subject to any disclaimer, the term of this patent is extended or adjusted under 35 U.S.C. 154(b) by 0 days.

(21) Appl. No.: 16/372,386

(22) Filed: Apr. 1, 2019

Related U.S. Application Data

(63) Continuation-in-part of application No. 15/861,524, filed on Jan. 3, 2018, now Pat. No. 10,251,247.

(60) Provisional application No. 62/442,279, filed on Jan. 4, 2017.

(51) Int. Cl.
| | |
|---|---|
| *H05B 37/02* | (2006.01) |
| *H04L 12/28* | (2006.01) |
| *H04B 5/00* | (2006.01) |
| *F21V 23/06* | (2006.01) |

(52) U.S. Cl.
CPC ......... *H05B 37/0272* (2013.01); *F21V 23/06* (2013.01); *H04B 5/0031* (2013.01); *H04L 12/2816* (2013.01)

(58) Field of Classification Search
None
See application file for complete search history.

(56) References Cited

U.S. PATENT DOCUMENTS

| | | | |
|---|---|---|---|
| 9,504,099 B2 | 11/2016 | McGuire et al. | |
| 2009/0230894 A1 | 9/2009 | De Goederen et al. | |
| 2011/0121654 A1* | 5/2011 | Recker | H02J 9/065 307/66 |
| 2013/0082598 A1* | 4/2013 | Csato | F21S 9/02 315/84 |
| 2013/0293112 A1 | 11/2013 | Reed et al. | |
| 2015/0173157 A1* | 6/2015 | Setomoto | H05B 37/0227 315/153 |
| 2015/0189726 A1 | 7/2015 | Spira | |

(Continued)

*Primary Examiner* — Minh D A
*Assistant Examiner* — James H Cho
(74) *Attorney, Agent, or Firm* — VLP Law Group LLP; James A. D. White

(57) ABSTRACT

Techniques are described for providing a smart-mesh socket. The smart-mesh socket may be sized and shaped to be engaged with a conventional electrical socket of one or more types (e.g., a USB receptacle providing DC electrical power) to provide power to one or more circuits housed within the smart-mesh socket. These circuits may include, for example, a main circuit that includes at least a dual processor for controlling the operation and communications of at least two communication circuits. The dual processors may execute instructions for an operating system, thus allowing the smart-mesh socket to provide enhanced capabilities for networked devices. One or more first communication circuits may each include one or more transceivers that allow the first communication circuit to send and receive communications with other devices over wireless network(s) using one or multiple wireless communication protocols.

30 Claims, 5 Drawing Sheets

(56) References Cited

U.S. PATENT DOCUMENTS

| | | | |
|---|---|---|---|
| 2015/0259078 A1* | 9/2015 | Filipovic | H04W 88/08 |
| | | | 244/114 R |
| 2015/0366039 A1 | 12/2015 | Noori et al. | |
| 2016/0105021 A1 | 4/2016 | Murray | |
| 2017/0238400 A1* | 8/2017 | Fathollahi | H05B 37/0272 |
| | | | 315/307 |
| 2017/0238401 A1 | 8/2017 | Sadwick et al. | |

\* cited by examiner

SMART MESH ELECTRICAL SOCKET

CROSS-REFERENCE TO RELATED APPLICATIONS

This application is a continuation-in-part of U.S. application Ser. No. 15/861,524, filed Jan. 3, 2018 and entitled "Smart Mesh Light Socket," now U.S. patent Ser. No. 10/251,247 issued Apr. 2, 2019, which is hereby incorporated by reference in its entirety. U.S. application Ser. No. 15/861,524 claims the benefit of U.S. Provisional Patent Application No. 62/442,279, filed Jan. 4, 2017 and entitled "Smart Mesh Light Socket," which is hereby incorporated by reference in its entirety.

TECHNICAL FIELD

This disclosure generally relates to technology for providing a mesh network of intelligent, connected devices.

BACKGROUND

Techniques for interconnecting devices via wireless transmissions are increasingly popular, such as to link smart phones and other mobile devices. However, difficulties exist in interconnecting at least some types of devices in at least some environments, such as within buildings with multiple rooms. Such difficulties prevent various benefits that may be available from such interconnections of devices.

DETAILED DESCRIPTION

Techniques and devices are described for connecting multiple devices and providing resulting functionality, such as for providing a mesh network of connected devices. In at least some embodiments, the devices include enhanced sockets (e.g., light bulb sockets) that each includes wireless transmission capabilities (e.g., one or more wireless transceivers and/or receivers) and computing capabilities (e.g., one or more processing units, one or more memories with stored software instructions, etc.), such as to allow multiple such enhanced sockets in one or more buildings or other locations to interact with each other, including in some embodiments to form an inter-connected mesh network that is used to provide functionality of one or more types in a distributed manner based at least in part on communications or other interactions between multiple enhanced sockets and/or other devices that are part of the mesh network (e.g., aggregated functionality that is provided by a combination of multiple enhanced sockets of the mesh network working together). Such an enhanced socket is generally referred to as a "smart-mesh socket" herein, and interconnections between such enhanced sockets are generally referred to as a "smart-mesh network" herein, with example embodiments of such enhanced sockets and mesh networks included below. In addition, while such a mesh network of enhanced sockets may provide various beneficial capabilities, as discussed below, such a mesh network may further connect to and interact with other devices external to the mesh network (e.g., mobile devices of users, smart wireless devices in a home or other building, etc.) and perform additional related functionality in at least some embodiments. Additional details related to such devices and techniques are included below.

Figure 1:
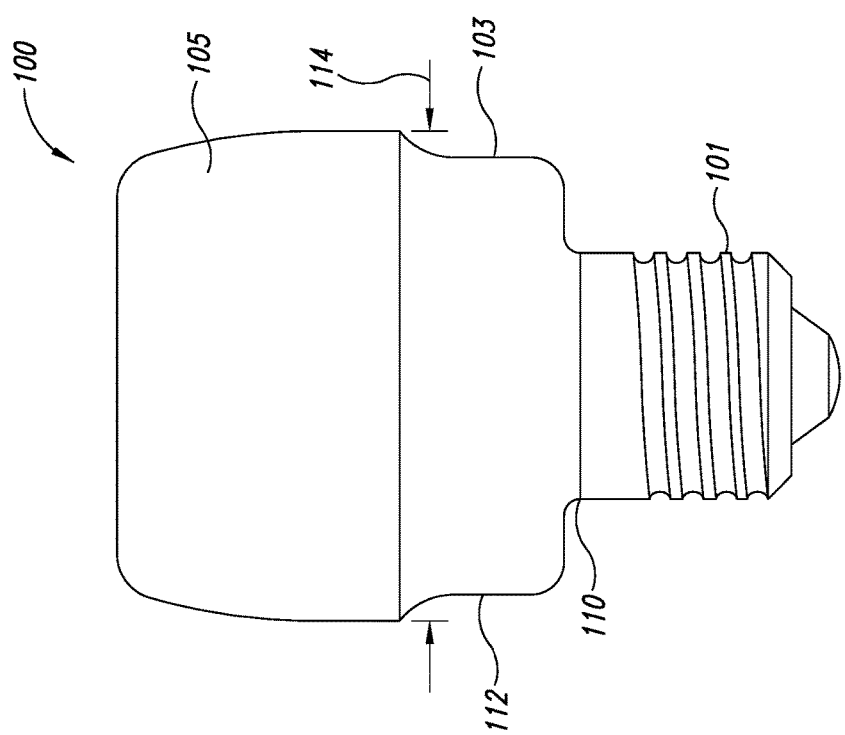
FIG. 1 illustrates an example of a smart-mesh socket, according to one illustrated implementation.

FIG. 1 illustrates an example of a smart-mesh socket 100, according to one illustrated implementation. The smart-mesh socket 100 illustrated in FIG. 1 is fully assembled, and includes a bottom cap 101, a lower case 103, and a top case 105. The bottom cap 101 is sized and shaped in this example embodiment to be engaged with a light bulb socket having an Edison-style screw base. For example, bottom cap 101 may be sized and shaped to be engaged in an E26/E27 standard base, an E39/E40 mogul base, an E14 base, or any other type of Edison-style screw base. In some alternative implementations, the bottom cap 101 may be sized and shaped to be engaged in some other electrical socket used for light bulbs, such as a bayonet style socket or a bi-post socket. In some implementations, the bottom cap 101 may be sized and shaped to be engaged with some other type of electrical outlet, such as a wall socket. The bottom cap 101 is comprised of material capable of conducting electricity from the light bulb socket, and providing the electricity to one or more circuits and/or light fixtures within or electrically coupled to the smart-mesh socket 100, as described below.

Lower case 103 and top case 105 are sized and shaped to enclose one or more circuits or circuit boards, including one or more circuit boards that are used to provide wireless communication capabilities to the smart-mesh socket 100, as discussed below. In addition, the circuit boards enclosed by the lower case 103 and the top case 105 may also include one or more circuit boards on which are mounted one or more processors (e.g., CPUs) or other processing units that can be used to control the functioning of the smart-mesh socket 100, including communications to and/or from the socket 100, also as discussed below. The lower case 103 has a base portion 110 that is sized and shaped to fit into the bottom cap 101 and an enclosure portion 112, that is opposite the base portion 110 and that contains the one or more circuit boards. The enclosure portion 112 flanges radially outward from the base portion 110 and away from the bottom cap 101 such that the enclosure portion 112 has a larger radius than the base portion 110. In some implementations, for example, the enclosure portion 112 of the lower case 103 may have a diameter 114 of about 54 mm. This larger area in the enclosure portion 112 may be used, for example, to completely or partially enclose the one or more circuits or circuit boards used by the smart-mesh socket 100. The lower case 103 may be comprised of a light-weight, non-conductive material that provides protection for the circuits or circuit boards enclosed within. For example, the lower case 103 may be comprised of a molded plastic piece. In some implementations, the lower case 103 may be comprised of materials processed using 3-D printing technology. In addition, while not illustrated in this example, the lower case 103 may in some embodiments include one or more holes or other apertures, such as to allow air flow to provide cooling to the circuit(s) or circuit board(s) enclosed within.

The top case 105 is sized and shaped to engage with the enclosure portion 112 of the lower case 103, thereby enclosing the one or more circuits or circuit boards used in the smart-mesh socket 100. When assembled, the total height 116 of the smart-mesh socket 100 from the bottom of the bottom cap 101 to the top of the top case 105 is about 79 mm. The top case 105 may have a substantially hollow center region that is sized and shaped to house a light bulb socket that receives a connector end for a light bulb. The top case 105 may be comprised of a light-weight, non-conductive material that provides protection for the circuits or circuit boards enclosed within. For example, the top case 105 may be comprised of a molded plastic piece. In some implementations, the top case 105 may be comprised of materials processed using 3-D printing technology. In some implementations, the color of the top case 105 or other visual attribute (e.g., size, shape, surface pattern, etc.) of the top case 105 may be used to visually indicate that a light socket or other electrical socket (e.g., a USB connector) has been adapted with a smart-mesh socket 100. For example, the top case 105 may be colored bright orange or red to provide a visual indicator that a smart-mesh socket 100 has been coupled to an ordinary light socket or other ordinary electrical socket. In addition, different colors may be used to indicate different versions or capabilities of various types of smart-mesh sockets 100, such as to indicate one or more of the following: one or more particular wireless communication protocols that the smart-mesh socket implements; a quantity of wireless communication protocols that the smart-mesh socket implements; one or more types of software that the smart-mesh socket implements; one or more types of electrical sockets that the smart-mesh socket includes (e.g., one or more light sockets, one or more USB sockets, etc.); one or more other physical attributes of the smart mesh socket (e.g., size); etc. The ability to visually determine the capabilities and layout of a smart-mesh network comprising multiple smart-mesh sockets 100 may be useful, for example, in big box stores with raised ceilings in which light sockets may be located 30 or 40 or more feet high, by allowing managers or users to identify smart-mesh sockets 100 and potentially determine the layout of the mesh network, all from the ground floor. In addition, while not illustrated in this example, the top case 105 may in some embodiments include one or more holes or other apertures, such as to allow air flow to provide cooling to the circuit(s) or circuit board(s) enclosed within.

Figure 2A:
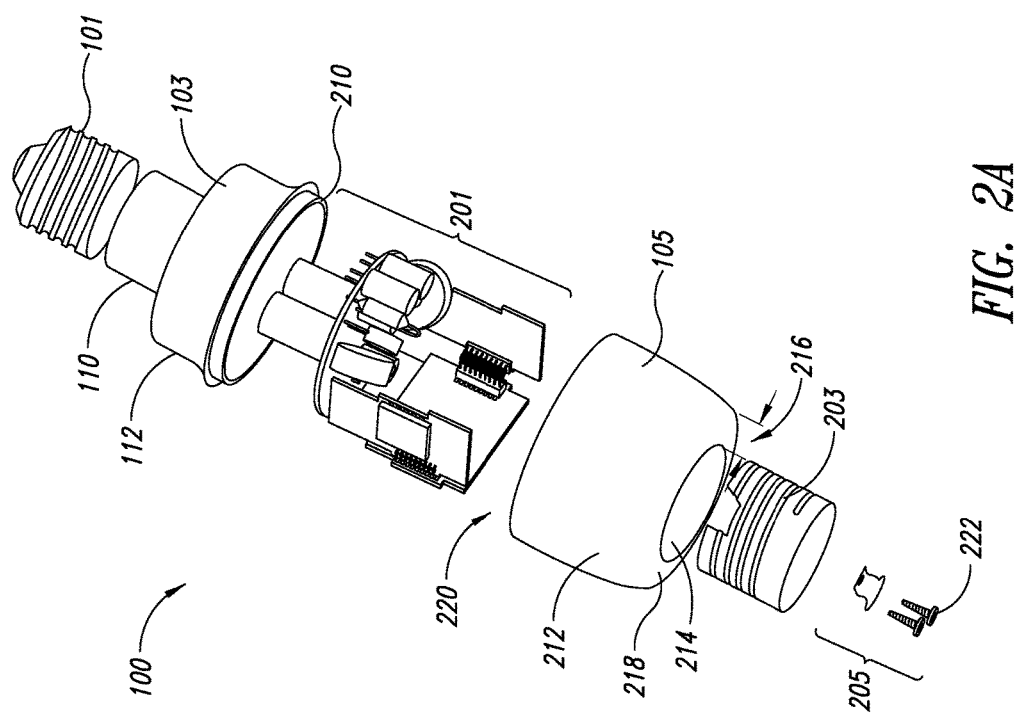
FIG. 2A is an exploded view showing components of a smart-mesh socket that includes Edison-style light bulb socket connectors, according to one illustrated implementation.

FIG. 2A is an exploded view showing the components of the smart-mesh socket 100, according to one illustrated implementation. The smart-mesh socket 100 includes a bottom cap 101, a lower case 103, a smart-mesh circuit 201, a top case 105, a top socket 203, and a center spring assembly 205. As shown in FIG. 2A, the base portion 110 of the lower case 103 is sized and shaped to fit into the bottom cap 101. The enclosure portion 112 of the lower case 103 receives the smart-mesh circuit 201. As shown in FIG. 2A, a portion of the smart-mesh circuit 201 may extend into the base portion 110 of the lower case 103 towards the bottom cap 101. In some implementations, this portion of the smart-mesh circuit 201 may be electrically coupled to one or more electrical connectors within the bottom cap 101 and be used to provide electricity to the smart-mesh circuit 201 when the smart-mesh socket 101 is engaged and electrically coupled with a light socket or other electrical outlet. The lower case 103 may include a lip 210 that is used to engage with the top case 105, thereby enclosing the smart-mesh circuit 201.

The top case 105 may be substantially annular in shape with an outside face 212 and an inside face 214 separated by a distance 216. In some implementations, the area between the outside face 212 and the inside face 214 may be substantially hollow, thus forming a recessed region within the top case 105. Such an implementation may advantageously reduce the weight and the material cost of the smart-mesh socket 100. The top case 105 may also have a top end 218 and a bottom end 220 that are substantially perpendicular to the outside face 212 and the inside face 214. As shown in FIG. 2A, the top end 218 may be solid and comprised of the same material as the outside face 212 and/or the inside face 214. In some implementations, the top end 218 may be substantially curved and form an arc when connecting two opposing points on the outside face 212 and the inside face 214. In some implementations, the bottom end 220 (not shown in FIG. 2A) may provide an opening to the recessed region formed between the outside face 212 and the inside face 214. Accordingly, at least some portion of the smart-mesh circuit 201 may extend up into and be housed within the recessed region between the outside face 212 and the inside face 214 of the top case 105. Using this recessed space allows the smart-mesh socket to be relatively smaller and more compact, and thus occupy less volume or space, than if this recessed space went unused. The opening in the bottom end 220 may be used to encompass the lip 210 on the lower case 103 such that the lip 210 fits between the outside face 212 and the inside face 214 of the top case 105 when the top case 105 is engaged with the lower case 103. Advantageously, engaging the lip 210 between the outside face 212 and the inside face 214 of the top case 105 may protect the smart-mesh circuit 201 from intrusion by environmental elements, such as moisture, dust, or other particles, that could interfere with the operation of the smart-mesh circuit 201.

As shown in FIG. 2A, the inside face 214 of the top case 105 has a radius that is sized and shaped to securely fit the top socket 203. The top socket 203 is used to engage a light bulb having an Edison shaped connector. The top socket 203 can also provide a grounded connection for the light bulb. In addition, the top case 105 may have one or more registration features to attach the center spring assembly 205. For example, the center spring assembly 205 may be attached to the top socket 203 using one or more screws 222 that are engaged with complementary threaded registration features (e.g., nuts) in the top case 105. The center spring assembly 205 may be used to provide a live or high connection for a light bulb screwed into the top socket 203. The top case 105 may alternatively be sized and shaped to be engaged with a different type of electrical socket, such as a bayonet-style socket or a bi-post style socket, instead of an Edison-style socket represented by top socket 203 and center spring assembly 205. In some implementations, the top case 105 may include a different style socket than that which is used to engage the bottom cap 101. For example, in some implementations, the bottom cap 101 may be an Edison-style connector while the top case 105 may be engaged with a bayonet style socket. Thus, in such implementations, the smart-mesh socket 100 may serve as an adapter or converter between various types or styles of light sockets.

Figure 2B:
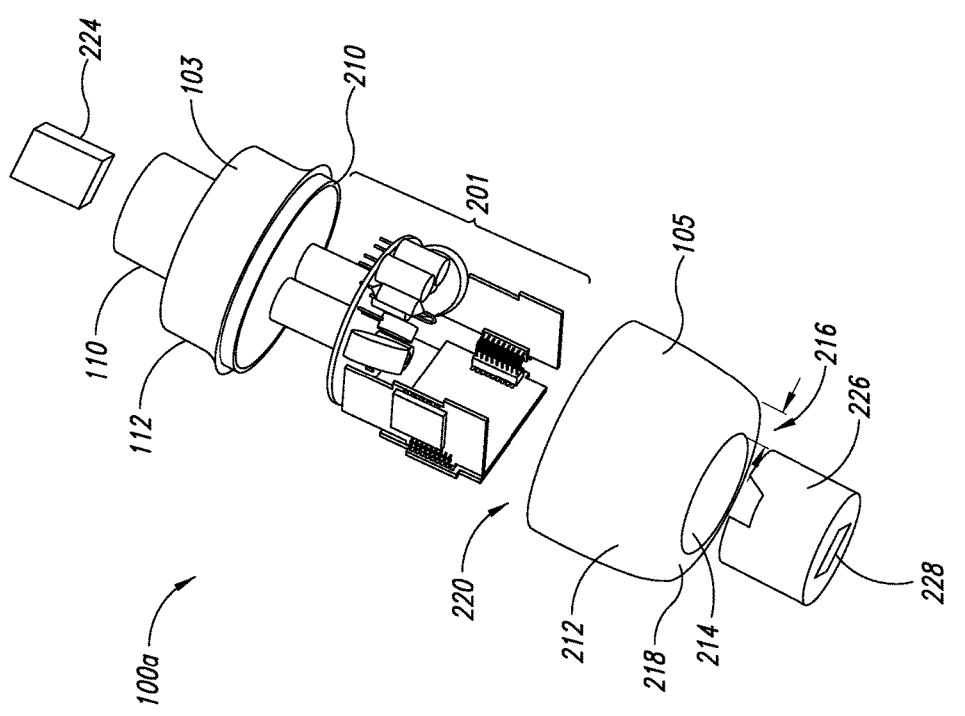
FIG. 2B is an exploded view showing components of a smart-mesh socket that includes Universal Serial Bus ("USB") style connectors, according to one illustrated implementation.

FIG. 2B shows a smart-mesh socket 100a that includes Universal Serial Bus ("USB") style connectors, according to one illustrated implementation. As such, the smart-mesh socket 100a may include the lower case 103, the smart-mesh circuit 201, and the top case 105, as discussed above with the smart-mesh socket 100. The smart-mesh socket 100a may include a first connector 224 that is located proximate the base portion 110 of the lower case 103. In some implementations, the first connector 224 may be a USB plug connector (e.g., a male style connector) at least a portion of which extends outward from the base portion 110 of the lower case 103 along a central axis that extends from a central portion of the top case 105 through the lower case 103. The exposed portion of the first connector 224 that extends outward from the base portion 110 of the lower case 103 may be sufficient to securely insert the smart-mesh socket 100a into an external USB receptacle (not shown) that is not part of the socket 100a. In some implementations, the first connector 224 may be a USB receptacle connector (e.g., a female style connector). In such an implementation, the first connector 224 may be contained entirely within the base portion 110 of the lower case 103.

The smart-mesh socket 100a may include an insert 226 that has a second connector 228. In some implementations, the second connector 228 may be a USB receptacle connector that receives a corresponding external USB plug (not shown) that is not part of the socket 100a in such implementations, the entire second connector 228 may be contained within the insert 226. In some implementations, the second connector 228 may be a USB plug connector, at least a portion of which may be exposed—in such an implementation, the exposed portion of the USB plug may extend outward from the insert 226 along a central axis that extends from the lower case 103 through a central portion of the top case 105. In some implementations, the smart-mesh socket 100a may not include an insert 226, but the top portion of the top case 105 may instead include a surface that includes the second connector 228, or include a smooth surface without any second connector 228.—alternatively, in some embodiments the top case 105 may include two or more second connectors (e.g., two or more USB receptacles), whether via one or more inserts or instead built directly into the surface of the top case 105. In embodiments in which the first connector 224 and the second connector 228 are both present and USB connectors, they may be of the same type (e.g., both "female" receptacles, both "male" plugs, etc.) or of different types (e.g., one "female" receptacle and one "male" plug), such as with either end of the socket 100a able to have either type in at least some embodiments. Although the first connector 224 and the second connector 228 are shown as USB connectors, other types of electrical and/or communication connectors may be used to electrically couple the smart-mesh socket 100a to other devices. For example, in other embodiments, the first connector 224 and/or second connector 228 (if present) may be AC (alternating current) electrical connectors, such as for first connector 224 to be an AC electrical plug (e.g., a two-prong NEMA 1-15 plug or three-prong NEMA 5-15 plug), and/or for second connector 228 to be an AC electrical socket (or vice versa). In such some embodiments, such AC electrical connectors may further be mixed with USB connectors in a smart-mesh socket, such as for first connector 224 to be an electrical plug that fits a standard electrical connector wall socket, and for second connector 228 to include one or more USB receptacles.

In such implementations, the smart-mesh socket 100a may be modularized, such that one or more different types of electrical couplers may be used to electrically couple the smart-mesh socket 100a. For example, in some implementations one or both of the insert 226 and/or the base portion 110 of the lower case 103 may be detachably coupled to the top case 105 and the lower case 103, respectively. As such, different types of electrical connectors (or no connectors) may be selectively, physically coupled to each of the top case 105 and/or the lower case 103. For example, as shown in FIG. 2A, Edison-style connectors may be selectively, physically coupled to the top case 105 and the lower case 103 such that the smart-mesh socket 100 may be inserted into an Edison-style light socket. As shown in FIG. 2B, USB-style connectors may instead be selectively, physically coupled to the top case 105 and the lower case 103 such that the smart-mesh socket 100a may be inserted into a USB connector. In addition, in some embodiments, different types of electrical couplers may be used for the top case and the lower case, such as to use a lower case Edison-style connector to attach to an existing light bulb socket for power (or a lower case two-prong or three-prong style connector to attach to a wall electrical outlet or other electrical outlet for power), and to use an upper case USB-style connector to provide power to one or more USB devices. Thus, other types of electrical connectors may be used to electrically couple the smart-mesh socket 100a to a power source.

Figure 3:
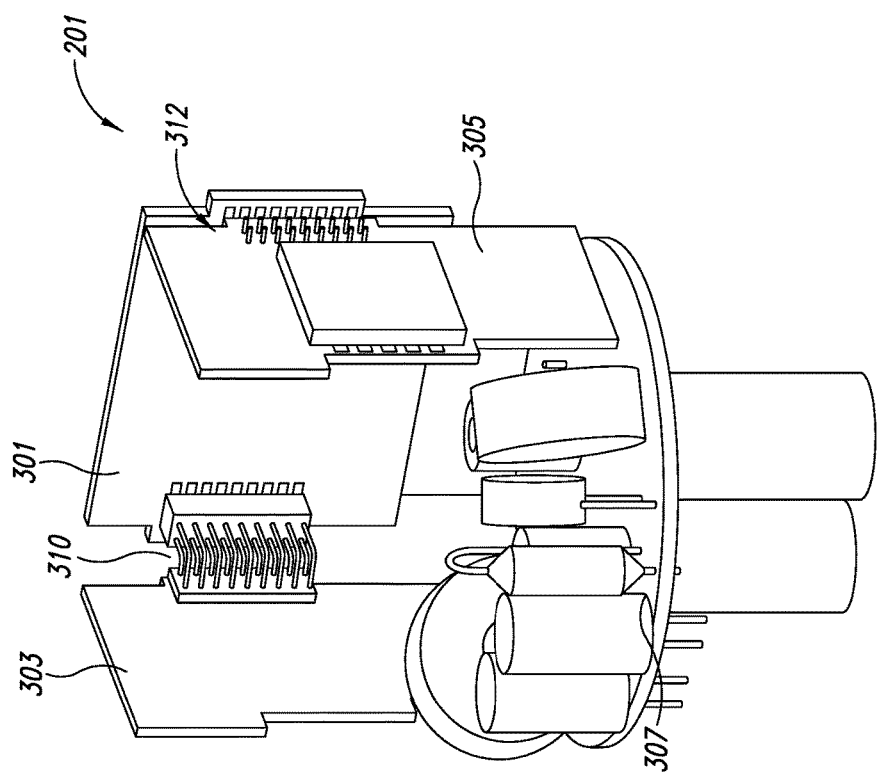
FIG. 3 is an illustration of a smart-mesh circuit, according to one illustrated implementation.

FIG. 3 is a diagram of the smart-mesh circuit 201, according to one illustrated implementation. The smart-mesh circuit 201 includes a main circuit 301, a first wireless circuit 303, a second wireless circuit 305, and a power circuit 307. In some implementations, the various circuits are arranged to reduce the overall size and footprint of the smart-mesh socket 100. For example, the main circuit 301, the first wireless circuit 303, and the second wireless circuit 305 may be electrically coupled to the power circuit 307 such that the circuit boards for the main circuit 301, the first wireless circuit 303, and the second wireless circuit 305 are each perpendicular to the circuit board for the power circuit 307. Further, the circuit board for the main circuit 301 may be perpendicular to the circuit boards for each of the first wireless circuit 303 and the second wireless circuit 305. The first wireless circuit 303 and the second wireless circuit 305 may be electrically and communicatively coupled to the main circuit 301 using one or more electrical connectors that form 90° angles, such as first connector 310 and second connector 312. In other embodiments, other quantities of wireless circuits separate from the main circuit 301 may be used, such as one wireless circuit (e.g., the first wireless circuit 303) or three wireless circuits (e.g., coupled to the top of the main circuit 301) or zero wireless circuits (e.g., if the wireless communication capabilities are incorporated on the main circuit 301. As noted earlier, such an arrangement of the various circuit boards allows for one or more of the circuit boards for the main circuit 301 and the one or more wireless circuits (e.g., multiple wireless circuits) to be housed within the recessed area formed between the outside face 212 and the inside face 214 of the top case 105 when the smart-mesh socket 100 is fully assembled.

Figure 4:
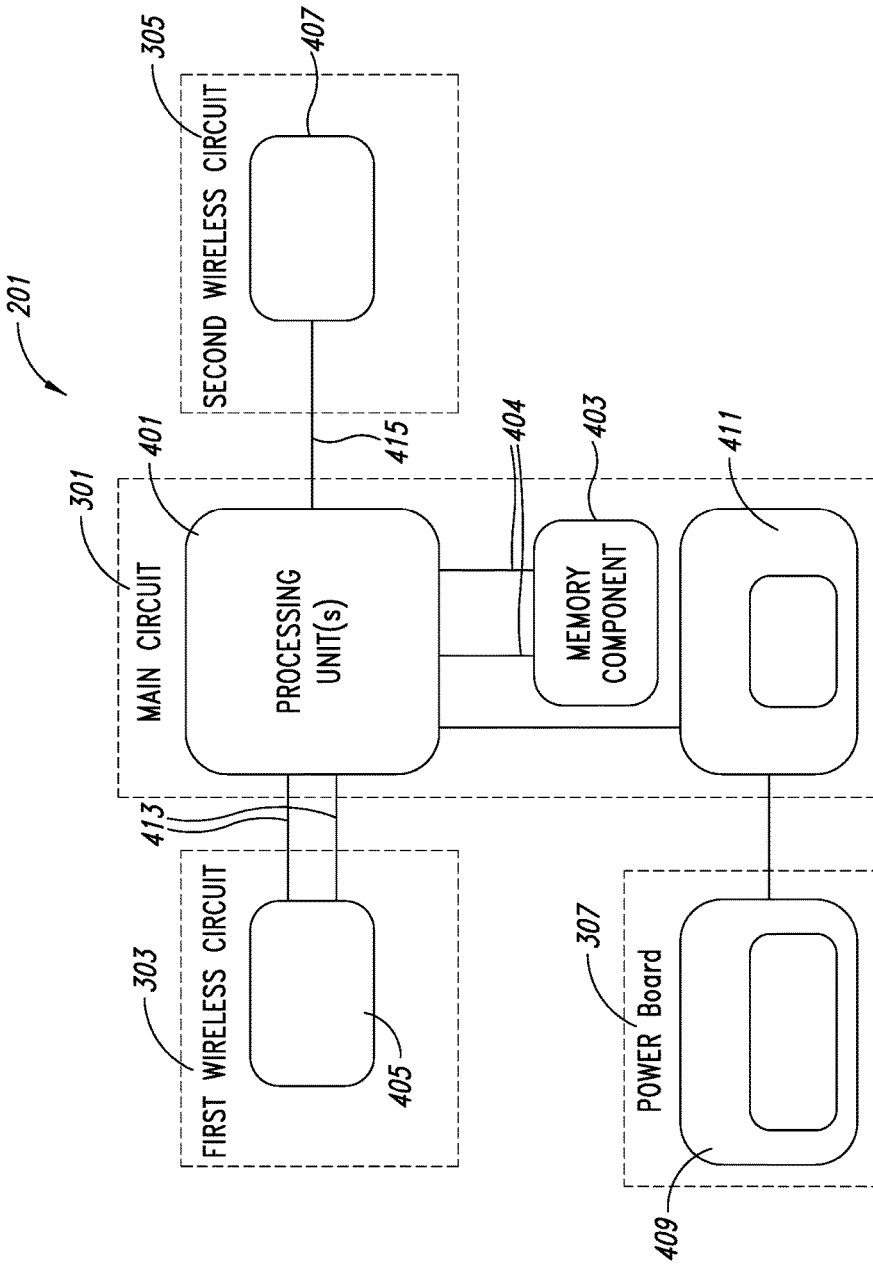
FIG. 4 is a block diagram showing components of a smart-mesh circuit, according to one illustrated implementation.

FIG. 4 is a block diagram showing components of the smart-mesh circuit 201, according to one illustrated implementation. The main circuit 301 includes one or more processing units 401 that control the operation and communications of the smart-mesh socket 100. The processing unit(s) 401 may be any logic processing unit, such as one or more central processing units (CPUs), digital signal processors (DSPs), application-specific integrated circuits (ASICs), field programmable gate arrays (FPGAs), etc. In some implementations, the processing unit 401 may include dual processors providing, for example, one processor to execute instructions controlling the first wireless circuit 303 and a second processor to execute instructions controlling the second wireless circuit 305. The main circuit 301 may include one or more memory components 403, such as non-transitory computer-readable or processor-readable media. The memory component 403 may include one or more nonvolatile memories such as read only memory (ROM) or FLASH memory and/or one or more volatile memories such as random access memory (RAM). In some implementations, the memory component 403 is a multi-chip package ("MCP") that is mounted onto the board for the main circuit 301. Such an MCP may be used to integrate multiple memory components into a single substrate that is then electrically and communicatively coupled to the board for the main circuit 301. For example, in some implementations, an MCP can include a low power double data rate synchronous DRAM (e.g., 1 GB LPDDR3) and an embedded Multi-Media Controller (e.g., 8 GB eMMC) that contains both flash memory and a flash memory controller. The MCP may also be referred to as a multi-chip module ("MCM") or a hybrid integrated circuit. The memory component 403 may further include various types of MCPs or MCMs, such as an MCM-L (laminated MCM), an MCM-D (deposited MCM), an MCM-C (ceramic substrate MCM), and a chip-stack MCM. The memory component 403 may be communicatively coupled to the processing unit 401 using one or more busses 404. The busses 404 may include one more parallel or serial connections capable of high speed communications such as, for example, a PCI (Peripheral Component Interconnect) bus, a PCI-E (PCI Express) bus, an ISA (Industry Standard Architecture) bus, an LPC (Low Pin Count) bus, or a USB (Universal Serial Bus) bus. In some implementations, the memory component 403 and the processing unit 401 may be communicatively coupled using a serializer-deserializer (SERDES) interface, such as may be used by Serial Port Memory Technology (SPMT).

In some implementations, the memory component 403 stores operating system software program(s) that can be executed by the processing unit 401 to implement one or more operating systems, and optionally may store one or more additional software programs to be executed by the operating system(s). For example, an implemented operating system may be a version of the Android® operating system, the Arduino Real Time Operating System (ARTOS), the Linux operating system or other UNIX-based operating system, the Java virtual machine or other Java-based operating system, or any other type of communications device operating system (e.g., iOS®, Windows® Phone, Windows® 8, or similar). Furthermore, additional software programs may, for example, include one or more application or app software programs that were designed to be executed on a mobile device (optionally with a GUI, or graphical user interface) but that are executed on the smart-mesh socket in the background, one or more application software programs that perform communications with other smart-mesh sockets and/or other devices to perform one or more of the types of functionality discussed herein, etc. In some embodiments, the additional software programs on some or all smart-mesh sockets include a mobile app that interacts with other smart-mesh sockets and/or other devices to perform functionality such as providing and managing user alerts, I/O (input/output) displays, workflows that include thresholds to be satisfied based upon data sensed by one or more smart-mesh sockets in the smart-mesh network, etc.—in at least some such embodiments, the mobile app and/or other additional software program may provide some or all functionality of a Distributed Functionality Provider (DFP) system (e.g., to manage interactions of multiple devices in one or more manners) and/or some or all functionality of a Location-based Task-Governor (LTG) or—Game system (e.g., to manage interactions between different devices and their users in one or manners, including to exchange information, coordinate the performance of tasks, etc.), optionally based on interactions with one or more remote servers external to a location of a smart-mesh network (e.g., a building in which the smart-mesh network is located), and with further details about functionality of an example DFP system included in U.S. patent application Ser. No. 13/725,531 (now U.S. Pat. No. 9,071,603), filed Dec. 21, 2012 and entitled "Distributed Functionality On Mobile Devices", and with further details about functionality of example LTG systems included in U.S. patent application Ser. No. 13/843,804, filed Mar. 15, 2013 and entitled "Location-Based Task And Game Functionality" and in U.S. patent application Ser. No. 14/498,767, filed Sep. 26, 2014 and entitled "Location-Based Task And Game Functionality" and in U.S. patent application Ser. No. 15/809,882, filed Nov. 10, 2017 and entitled "Controlling Distributed Device Operations". Some or all such operating system software programs and/or additional software programs may, for example, be downloaded to one or more smart-mesh sockets from one or more remote servers, such as remote servers that aggregate information and/or functionality for various devices, such as to provide personalized services or other functionality to particular users (e.g., as part of a marketplace in which various users have accounts to which user-specific information and/or functionality is associated)—in embodiments in which such remote server(s) are used, they may further in at least some embodiments provide one or more databases or other storage capabilities used by smart-mesh sockets, as discussed in greater detail elsewhere herein. It will be appreciated that providing and using an operating system and optionally one or more additional software programs with a smart-mesh socket allows the smart-mesh socket 100 to provide intelligent functionality directed not only towards light bulbs engaged in the top socket 203, but also towards other wireless devices communicatively coupled to one or more of the wireless circuits 303 and 305, as well as to allow dynamic changes to operation during use by changing the software programs to be executed. In such implementations, this intelligent functionality may be pushed out and provided by devices, such as the smart-mesh sockets 100, located at the edge of the mesh network.

For example, in embodiments in which multiple smart-mesh sockets 100 are used in a retail store, the operating system and additional software programs (if any) may allow the various smart-mesh sockets 100 to track customers throughout the store based on monitoring transmissions from each customer's mobile devices. The data gained from tracking customers may allow the store operator to, for example, generate heat maps related to customer movements throughout the store, or identify relationships between various products located throughout the store. The operating system may also allow the store operator to use the smart-mesh sockets 100 to deploy one or more geo-fences throughout the store that each include one or more boundaries (e.g., to include or exclude a defined space). Such geo-fences may be used to provide alerts, notifications, coupons, or other communications out to mobile devices that enter and/or leave the geo-fenced region.

As another example, in embodiments in which multiple smart-mesh sockets 100 are used in a building with multiple rooms (e.g., an office building, house or home, apartment or condominium building, hotel, mall or other group of retail stores, etc.), the operating system and additional software programs (if any) may allow the various smart-mesh sockets 100 to provide smart-building functionality of various types to the building, such as to monitor environmental conditions and/or occupancy (e.g., foot falls, dwell times, etc.) throughout the rooms, provide remote administration of operations of electrical devices in the various rooms (e.g., from a central control location within or external to the building, such as over an Internet connection from external computer systems to a mesh network of inter-connected sockets 100 within the building), implement energy conservation programs, track package deliveries, enable shared space reservations, etc.

Additional examples of functionality that multiple inter-connected devices (e.g., multiple sockets 100 and/or other client devices that wirelessly connect to one or more such sockets 100) may perform, including for a mesh network of multiple inter-connected devices, are included in U.S. patent application Ser. No. 13/725,531, filed Dec. 21, 2012 and entitled "Distributed Functionality On Mobile Devices," now U.S. Pat. No. 9,071,603, which is hereby incorporated by reference in its entirety.

In the example embodiment of FIG. 4, the main circuit 301 includes a DC power component 411. In some implementations, the DC Power component 411 is a power management integrated circuit (PMIC) that can manage the power requirements for the smart-mesh circuit 201. In some implementations, the DC power component 411 may be used to provide DC-to-DC power conversion for one or more components within the smart-mesh circuit 201 or to regulate the power being supplied to the smart-mesh circuit 201. The DC power component 411 may be electrically coupled to the processing unit 401 using any appropriate power bus, such as I²C bus technology.

As shown in the example embodiment of FIG. 4, the first wireless circuit 303 within the smart-mesh circuit 201 may include one or more transceivers (such as transceiver 405) that each communicates with other devices through a local area network and/or a wireless ad hoc network, such as those provided by technologies and wireless communication protocols including Wi-Fi Direct® or other Wi-Fi functionality based on the IEEE 802.11 standard, Bluetooth®, NFC (Near-Field Communication), 802.15 (ZigBee®), 3G wireless and/or 4G wireless (e.g., LTE, NB-IoT, etc.), 5G wireless, etc. As one non-limiting example embodiment, a smart mesh socket (e.g., with one or more USB connectors) may include one or more transceivers (e.g., one or two or three or four transceivers, on zero or one or two or three or four wireless circuits separate from the main circuit 301, such as one or more wireless circuits 303 and/or wireless circuits 305) that support four or more wireless communication protocols, such as to use LTE and/or NB-IoT wireless communication protocols to participate in one or more mesh networks, and to use Wi-Fi Direct (or other Wi-Fi functionality) and/or Bluetooth to interact with other devices separate from the smart mesh sockets and/or to interact with other smart mesh sockets of at least one other mesh network—in such an embodiment, it will be appreciated that such a smart mesh socket could participate in a first mesh network using a first wireless communication protocol (e.g., LTE) and simultaneously or later participate in a second mesh network using a different second wireless communication protocol (e.g., NB-IoT), and/or could participate in one or more mesh networks simultaneously and/or serially that each uses multiple of the supported wireless communication protocols (e.g., two or three or four of LTE, NB-IoT, Wi-Fi, Bluetooth, etc.). As noted above, each smart-mesh socket may include one or more wireless transceivers (e.g., two, three, four, five, etc. transceivers) that support multiple wireless communication protocols (e.g., two, three, four, five, etc.), and in some implementations a single transceiver such as transceiver 405 may communicate using multiple wireless communication protocols (e.g., Bluetooth; Wi-Fi, such as Wi-Fi Direct or other Wi-Fi based on IEEE standard 802.11; LTE, or Long Term Evolution, wireless broadband; NB IoT, or Narrow Band Internet of Things; etc.), and serve as a bridge allowing devices connected to such a transceiver to communicate with each other using multiple different wireless protocols. The first wireless circuit 303 may be communicatively coupled to the processor unit 401 using appropriate connections 413, which may be serial or parallel connections capable of high speed communications, such as via FireWire®, Universal Serial Bus® (USB) 2 or 3, Thunderbolt®, and/or Gigabyte Ethernet®. In some implementations, the connections 413 may use Secure Digital Input Output (SDIO) technology and/or (UART) technology to provide communication links between the first wireless circuit 303 and the processing unit 401.

The transceiver 405 allows the smart-mesh circuit 201 to send and receive data and communications with other devices. For example, the transceiver 405 may allow the smart-mesh circuit 201 to connect with other smart-mesh circuits 201 associated with other smart-mesh sockets 100 in order to form a mesh network. The mesh network may advantageously allow the components of the mesh network to communicate directly with one another and/or to provide seamless communications to a user's device (or between multiple users' devices) as the user(s) move about a store or other building or location covered by the mesh network. Each of the smart-mesh circuits 201 deployed within a mesh network may act as a relay to pass data or communications generated within the mesh network to other devices also located within the mesh network or to other devices located outside of the mesh network. In some implementations, the transceiver 405 may be used to transmit advertisements, coupons, or other information to user devices within range of the transceiver 405. The transceiver 405 may also be used to receive communications and data from user devices. Such user devices may include, for example, one or more of: an iPhone, an iPad, an iPod Touch, an Android OS ("operating system") device, a Windows Phone OS device, a Kindle Fire device, a Nook Tablet device, a Blackberry device, a Nintendo OS device, a portable Sony PlayStation device, etc. The transceiver 405 also allows a network operator to push over-the-air updates to the operating system and/or other software stored on the memory component 403, such as during ongoing operations while the smart-mesh circuit is in use, allowing the network to quickly, easily, and efficiently push updates to the software on each of the smart-mesh circuits 201 within a mesh network.

The second wireless circuit 305 within the smart-mesh circuit 201 may in this example embodiment include a passive receiver 407 that monitors communications by devices using wireless capabilities, such as devices that have Wi-Fi Direct® or other Wi-Fi functionality based on the IEEE 802.11 standard, Bluetooth®, NFC, 802.15 (ZigBeen, 3G wireless and/or 4G wireless (e.g., LTE, NB-IoT, etc.), 5G wireless, and similar technologies, although in other embodiments at least some smart mesh sockets may not include such a passive receiver that monitors communications without also acting as a transceiver by transmitting communications. The second wireless circuit 305 may be communicatively coupled to the processor unit 401 using appropriate connections 415, which may be serial or parallel connections capable of high speed communications, such as via FireWire®, Universal Serial Bus® (USB) 2 or 3, Thunderbolt®, and/or Gigabyte Ethernet®. In some implementations, the connections 415 may use Secure Digital Input Output (SDIO) technology and/or (UART) technology to provide communication links between the second wireless circuit 305 and the processing unit 401.

The passive receiver 407 may be used by the smart-mesh circuits 201 within a mesh network to track user devices as the devices move about the area covered by the mesh network, although such tracking may similarly be performed by one or more transceivers in other embodiments. Such tracking may occur, for example, in instances when the user is not actively using their device to send a communication, such as by placing a telephone call or transmitting text message on a wireless device. For example, a mobile device that has enabled wireless capabilities (e.g., Wi-Fi or Bluetooth) may periodically transmit a wireless MAC address so that the device can be detected by nearby wireless sensors and potentially connect to a wireless network. In these cases, the passive receiver 407 may detect the transmission of the wireless MAC address as the device moves about the mesh network created by the smart-mesh circuits 201 of multiple smart-mesh sockets. Further, because the wireless MAC address in some cases does not change, the tracking data collected from the various smart-mesh circuits 201 can be aggregated, such as by a database or other storage that is communicatively coupled to one or more of the smart-mesh circuits 201 (e.g., a distributed database or other distributed storage coupled to each smart-mesh circuit, a non-distributed database or other non-distributed storage coupled to one or more smart-mesh circuits to which other smart-mesh circuits forward information for the database, a database or other storage on one or more remote servers at a location separated from the smart-mesh socket(s) and/or smart-mesh network by one or more intervening computer networks, using a blockchain storage architecture in which some or all smart-mesh sockets in a mesh network independently store information using cryptographic techniques to identify changes, etc.), to show the movements of a particular wireless device throughout the mesh network. Such tracking and aggregation of data can be performed in real-time in some implementations. The use of multiple smart-mesh circuits 201 within a mesh network allows for a highly precise determination of a device's location using known methods, such as, for example, a triangulation method based on signal strength. Accordingly, using a second wireless circuit 305 with a passive receiver 407 within the smart-mesh socket 100, in addition to the transceiver 405, allows for additional functionality (e.g., tracking, monitoring, etc.) that may not be possible with conventional devices that include just one wireless component that serves either as a transceiver or as a transmitter/beacon. In addition, the unique wireless MAC addresses can be used by a database or other storage to track a user's activities over time and across multiple different visits to the mesh network over a period of days, weeks, or even years.

As shown in FIG. 4, the smart-mesh circuit 201 includes a power circuit 307. The power circuit 307 includes an AC power component 409 that receives AC power provided to the smart-mesh socket 100 at the bottom cap 101 and converts the AC power to DC power that can be used by the various components of the smart-mesh circuit 201. In some implementations, for example, the AC power component 409 includes a pulse width modulator ("PWM") that can be used to convert the incoming AC power to DC power that is provided to the DC power component 411. In some implementations, the AC power component 409 may also include the appropriate connections to provide AC power to operate a light bulb or other electrical device engaged with the smart-mesh socket 100. In other embodiments in which one or more USB connectors are used to supply and/or receive DC (direct current) power, the power circuit 307 may not include the AC power component 409, or may not be present.

The above description of illustrated embodiments and implementation, including what is described in the Abstract, is not intended to be exhaustive or to limit the embodiments or implementations to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to providing various types of mesh networks.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any computer-readable medium for use by or in connection with any processor-related system or method. In the context of this disclosure, a memory is a computer-readable medium that is an electronic, magnetic, optical, or other physical device or means that contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

Many of the methods described herein can be performed with variations. For example, many of the methods may include additional acts, omit some acts, and/or perform acts in a different order than as illustrated or described.

In the description above, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures and methods associated with graphical user interfaces, smartphones, technology for receiving and processing input received through a touchscreen display, closed-loop controllers used to control processing conditions, and wired and wireless communications protocols have not been shown or described in detail to avoid unnecessarily obscuring descriptions of the embodiments.

Unless the context requires otherwise, throughout the specification and claims, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments or implementations.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

It will also be appreciated that identical reference numbers in the drawings identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements, and may have been solely selected for ease of recognition in the drawings.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to U.S. Pat. No. 9,071,603, filed Dec. 21, 2012 and entitled "Distributed Display Functionality On Multiple Mobile Devices"; U.S. patent application Ser. No. 13/843,804, filed Mar. 15, 2013 and entitled "Location-Based Task And Game Functionality"; U.S. patent application Ser. No. 14/498,767, filed Sep. 26, 2014 and entitled "Location-Based Task And Game Functionality"; U.S. patent application Ser. No. 15/809,882, filed Nov. 10, 2017 and entitled "Controlling Distributed Device Operations"; U.S. patent application Ser. No. 14/719,161, filed May 21, 2015 and entitled "Providing Distributed Functionality Via Multiple Devices"; U.S. Provisional Patent Application No. 62/318,186, filed Apr. 4, 2016 and entitled "Functionality For Inter-Device Audio-Based Instructions"; International Publication No. WO 2013/148887, filed Mar. 27, 2013 and entitled "Location-Based Task And Game Functionality"; ROC (Taiwan) Patent Application No. 102111015, filed Mar. 27, 2013 and entitled "Location-Based Task And Game Functionality"; ROC (Taiwan) Patent Application No. 105101919, filed Jan. 21, 2016 and entitled "Computer-Implemented Method, Non-Transitory Computer-Readable Medium And Configured System"; and ROC (Taiwan) Patent Application No. 105140889, filed Dec. 9, 2016 and entitled "Computer-Implemented Method, Non-Transitory Computer-Readable Medium And Configured System"; all of which are incorporated herein by reference in their entirety. Aspects of the embodiments can be modified, if necessary, to employ systems, circuits and concepts of the various patents, applications and publications to provide yet further embodiments.

For example, as noted above, smart mesh sockets participating in a mesh network may, in at least some embodiments, provide some or all functionality of a Distributed Functionality Provider (DFP) system (e.g., to manage interactions of multiple devices in one or more manners), with further details about functionality of an example DFP system included in U.S. patent application Ser. No. 13/725,531 (now U.S. Pat. No. 9,071,603), filed Dec. 21, 2012 and entitled "Distributed Functionality On Mobile Devices". Such functionality of a DFP system may include techniques for coordinating the inter-connection of multiple devices (e.g., multiple smart-mesh socket devices participating in a mesh network and/or other devices interacting with the mesh network), such as for multiple devices of multiple distinct types, and optionally using multiple different types of inter-connections. As one illustrative example, first and second devices of different first and second types may be inter-connected using a first local wireless protocol (e.g., Bluetooth), the second device may be interconnected with a distinct third device of a third type using a distinct second wireless protocol (e.g., Wi-Fi), and the third device may be inter-connected with one or more fourth remote server computing systems using a third remote networking protocol (e.g., 3G wireless or 4G wireless using one of various underlying implementation technologies; WiMAX; etc.). To continue the illustrative example, functionality that is available from the fourth remote server computing systems may be provided to a group of some or all of the first, second and third devices via the connection between the third device and the fourth remote server computing systems, and the other inter-connections between the devices of the group. Accordingly, to support this illustrative example, the described techniques may in some embodiments include coordinating the inter-connections between the devices of the group and/or the fourth remote server computing systems in various manners, such as by selecting a particular type of inter-connection to use between two devices or systems when multiple alternatives are available, selecting one or more particular devices to perform a particular type of operation on behalf of the group and/or provide a particular type of functionality to the group, etc.

The described techniques include performing matchmaking operations in at least some embodiments to determine whether and/or how a group of multiple inter-connected devices (e.g., a group to represent a mesh network, such as to include the smart-mesh sockets of the mesh network and/or one or more other devices interacting with the mesh network) will provide functionality to each other and/or will access functionality from one or more remote server computing systems, including to select a host device for the group, such as from multiple candidate devices within the group. The host device may in some embodiments and situations host various functionality that is made available to other devices of the group, such as with respect to an application that is being executed and/or used in a distributed and coordinated manner by the devices of the group—such situations may include those in which a connection to remote server computing systems is not currently available or in use, and the host device may be selected from multiple candidate devices within the group that are options for hosting the functionality for the group. In addition, the host device may in some embodiments and situations provide a connection to one or more particular remote server computing systems, such as to enable functionality to be provided to the devices of the group corresponding to an application that is being executed and/or used in a distributed and coordinated manner by the devices of the group—in such situations, the host device may be selected from multiple candidate devices within the group that are options for providing such a connection.

As an illustrative example, a particular remote server computing system may be an application server that provides, sponsors or otherwise supports one or more groupware applications that are usable in a distributed collaborative manner on a group of multiple inter-connected devices (e.g., a distributed document creation application; an application that allows inter-communications between multiple users, such as video conferencing; etc.), and the matchmaking operations may include selecting at least one device of the group to be a host that provides a connection to the application server, to enable functionality of the groupware application to be provided to the group of devices in a coordinated and distributed manner. If a connection to the remote server computing system is not currently available or in use, the host device may attempt to provide some or all of the functionality that would otherwise have been provided by the remote server computing system with respect to providing distributed functionality for an application to the devices of the group, such as by using information that is stored locally to the host device or that is otherwise accessible to the host device (e.g., is stored on one or more other devices of the group). In addition to distributed groupware applications, a variety of other types of applications may be used by a group of multiple devices in various embodiments and situations, including for one or more remote computer systems to perform administrative and/or control functionality over multiple smart-mesh sockets of a mesh network and/or over other devices associated with such smart-mesh sockets (e.g., environmental controls, security controls, etc., such as to provide smart home or other smart building functionality to a home or other building that includes the smart-mesh sockets from a remote location).

The matchmaking operations, such as to determine whether and/or how a group of multiple inter-connected devices will provide functionality to each other and/or will access functionality from one or more remote server computing systems, may include considering one or more of a variety of factors when selecting a particular host, such as factors corresponding to the devices that are part of the group, to users (if any) associated with those devices, and/or to the application being accessed. In addition, in some embodiments and situations, multiple host devices may be selected for a particular group to provide distributed functionality for an application to the devices of the group, such as to operate together in a distributed manner, or instead at different times or in different roles. The described techniques further include providing capabilities to accommodate changes to a group of devices, including with respect to a current host of the group. With respect to a current host, the described techniques may include providing host migration capabilities in at least some embodiments that enable changing a host for a group of multiple devices when one or more criteria are satisfied, including in some situations when a current host for the group leaves the group or otherwise becomes unavailable to serve as the host for the group (e.g., loses power or otherwise stops functioning correctly, loses connection capabilities to one or more remote server computing systems, leaves a geographic location or area of the group of devices, requests to no longer be the host, etc.). Such host migration capabilities may include performing additional matchmaking operations to select a new host for the group of devices, whether in the same manner or a different manner from prior matchmaking operations that were previously performed to select the current host that is being replaced. For example, if a current host device for a group of multiple devices is engaged in a session of interactions with one or more remote server systems (e.g., as part of executing one or more particular applications for the group), and a new host device is selected from one of the other multiple devices in the group, the new host device may seamlessly take over and continue the same ongoing session of interactions with those one or more remote server systems. In at least some embodiments and situations, the host change operations may be performed dynamically while an application continues to be in use by the devices of the group (e.g., by continuing ongoing operations of a particular interaction session with one or more remote server systems), including to make any changes in a manner that is transparent to some or all of the devices and/or their users. The host change operations may be performed or coordinated in some situations by one or more devices of the group (e.g., by a current host device, by all of the devices of the group in a distributed manner, etc.), including in situations in which a remote connection to a remote server computing system is not available or is otherwise not in use, and may also be performed or coordinated in some situations by a remote server.

In addition, in at least some embodiments, a group of multiple devices may be formed with respect to a particular application, such as based on those devices participating in that application in a distributed manner—other groups of devices may also optionally be executing that same application in a simultaneous or overlapping manner, but with each group's execution of the application being unrelated to that of the other groups. In such embodiments, the group membership for a particular group may change as devices (and/or their users, if any) join or leave the distributed use of the application, even if a particular device that joins or leaves has not changed its location or current use of device capabilities. Thus, if a number of devices are in a given geographic location or area (e.g., in a room or building), different subsets of the devices may be joined together into different groups, and the group memberships may change not only based on the locations of the devices (e.g., based on devices joining or leaving the geographic location or area), but also based on changes in activities of the devices (and/or of their users, if any). In some embodiments and situations, a device may simultaneously be part of multiple groups, including in situations in which the device is executing multiple different applications corresponding to the different groups, whether the multiple groups are distinct other than for that device being in both groups, or instead have other overlapping member devices, and whether or not there are any interactions between the multiple different applications.

In some embodiments and situations, particular devices (and/or their users, if any) may be invited to join a particular group and/or may be provided with information that enables the device/user to perform actions to initiate joining a group. For example, a particular user may be provided with information about one or more other users that are geographically nearby, such as to enable the particular user to join those other users and participate in a group with them if so desired, or the particular user may be provided with information about one or more other users that are geographically remote but participating in particular activities of interest (e.g., using a particular application), such as to enable the particular user to logically join those other users over one or more computer networks and participate in a group with them if so desired. The information provided to the particular user may in some embodiments and situations be only partial information about the other users and/or devices, such as to protect private information of the other users (e.g., as specified by those other users, such as in previously specified preferences or access controls) or for other reasons (e.g., to limit an amount of bandwidth used, to provide only information that is currently most relevant, etc.)—as one example, the provided information may indicate a general location and activities of other users, without providing information about identities of the other users.

In addition, as noted above, smart mesh sockets participating in a mesh network may, in at least some embodiments, provide some or all functionality of a Location-based Task-Governor (LTG) or—Game system (e.g., to manage interactions between different devices and their users in one or manners, including to exchange information, coordinate the performance of tasks, etc.), with further details about functionality of an example DFP system included in U.S. patent application Ser. No. 13/843,804, filed Mar. 15, 2013 and entitled "Location-Based Task And Game Functionality," and in U.S. patent application Ser. No. 14/498,767, filed Sep. 26, 2014 and entitled "Location-Based Task And Game Functionality," and in U.S. patent application Ser. No. 15/809,882, filed Nov. 10, 2017 and entitled "Controlling Distributed Device Operations". Such functionality of an LTG system may include techniques for controlling distributed operations of devices (e.g., of smart-mesh sockets participating in a mesh network and/or of one or more other devices interacting with the mesh network). In at least some embodiments, the devices are each part of or otherwise associated with a mechanical system that contains one or more actuators to manipulate a surrounding environment and that may further contain one or more sensors to obtain information from the surrounding environment, such as for a device to control the associated system to perform industrial operations in at least some embodiments—as non-exclusive examples, the devices may be part of or otherwise associated with environmental controls for a building (e.g., as part of one or more HVAC, or heating, ventilation and air conditioning, units), or may be part of or otherwise associated with industrial robots or other mobile robotic systems that maneuver in a surrounding environment and/or manipulate surrounding objects. In addition, the described techniques may include identifying a group of multiple such devices to perform one or more assigned tasks, such as in a cooperative distributed manner in which each device of the group performs part of the one or more assigned tasks, and/or in a competitive manner in which some or all devices of the group independently perform at least one assigned task. The performances of the devices may further be evaluated in various manners, and the devices selected to perform one or more tasks may be identified in various manners (including based at least in part on past performance evaluations), as discussed in greater detail below.

As noted above, a group of devices may be assigned one or more tasks to be performed, such as by controlling mechanical systems or other systems associated with the devices. Such tasks may be of various types that correspond to the associated mechanical systems or other systems—as non-exclusive examples, tasks for one or more associated HVAC systems may include setting and maintaining specified environment conditions (e.g., temperature), and tasks for one or more associated mobile robotic systems may include moving to locations of indicated physical objects and manipulating them in specified manners. More generally, other tasks for devices and/or their associated systems may include identifying a location of a particular device or other object (e.g., based on which of multiple devices in a group have strongest signal strength in a wireless connection to the particular device, which of multiple camera systems or other sensor systems can sense the particular device or other object, etc.), providing network connectivity to a particular device, providing a mesh of network connectivity and/or other functionality over a specified area, obtaining sensor information of a specified type in one or more specified locations, etc. Furthermore, performance of a task by a device may include the device implementing one or more specified types of operations (e.g., communicating with an associated system in a particular manner, performing a specified activity provided by the device, etc.), such as with an LTG server system (e.g., one or more of multiple smart-mesh sockets of a mesh network, a local server computing system interacting with the mesh network, a remote server computing system interacting with the mesh network, etc.) determining the one or more specified types of operations for the task and instructing the device to implement those types of operations, or with the LTG server system assigning the task to the device and having the device determine the one or more specified types of operations to implement.

In addition, the performance of a device in completing one or more tasks (or in implementing one or more specified types of operations associated with one or more tasks) may be evaluated in various manners in various embodiments, including based on one or more specified criteria (e.g., the same criteria for all tasks/operations; task-specific and/or operation-specific criteria, such as may be specified by a client of the LTG server system that requests the task performance; etc.). Non-exclusive examples of criteria for evaluation may include one or more of the following: how quickly a task or operation is performed; if a task or operation is completed by a specified completion time; if a task or operation is successfully completed; using accuracy or other quality of results generated from task or operation completion; etc. Furthermore, evaluation of a device's performance may further be based at least in part on performance of other devices in a common group (e.g., a group to represent a mesh network, such as to include the smart-mesh sockets of the mesh network and/or one or more other devices interacting with the mesh network), such as in comparison to the other devices in situations involving competitive task performance (e.g., a relative ranking compared to the other devices), and/or in combination with the other devices in situations involving cooperative task performance (e.g., based at least in part on how the overall group cooperatively accomplished one or more assigned tasks, on how the device contributed to the overall group performance, etc.). In addition, when multiple inter-related tasks are performed in part or in whole by a device, the evaluation of the device's performance may be based on performance of the multiple inter-related tasks, including how well dependencies and other relationships between the multiple tasks are managed. Furthermore, information about a device's task or operation performance activities may be provided to the LTG server system (and/or to other devices) in various manners in various embodiments, including for the device to push some or all such information to the LTG server system or other devices (e.g., periodically, upon completion of performance of a task or operation, when other criteria are satisfied, etc.), and/or for some or all such information to be pulled by the LTG server system or other devices (e.g., for the device to respond to received requests for particular task or operation performance information and/or other information about the device, such as a current workload, location, etc.).

A device may further be selected or identified to perform a task in various manners in various embodiments, including based on the device being part of a group of devices to perform one or more such tasks and/or based on the device being available to join such a group. Various factors may be used in such device selection, including one or more of the following non-exclusive example factors, and optionally by using weighting to combine multiple such factors: a current performance evaluation score and/or past performance evaluation scores for the device (whether for any tasks/operations, or for other tasks/operations of the same or similar types); a current and/or past and/or expected future location of the device; a current and/or past and/or expected future workload of a device (e.g., in performing other tasks or activities); priority of a task to be assigned, optionally relative to priorities of other tasks currently being performed or scheduled to be performed by the device; an ability to perform a task to be assigned by a specified completion time in combination with one or more other related tasks that have a defined order or other dependencies; current and/or scheduled maintenance on a device; etc. Furthermore, one or more devices may be selected to be primary devices based on their evaluated performance scores, such as for one or more of a type of operation or particular operation, type of task or particular task, geographical location, etc.—if so, the primary device(s) may be selected in the future for corresponding tasks to be performed, whether exclusively (by excluding other non-primary devices for such tasks) or by giving a preference or weighting to the primary devices (e.g., to use the primary devices if they are available, but to otherwise select other devices).

Furthermore, in at least some embodiments and situations, a task to be performed by a group of devices may be part of multiple inter-related tasks, such as with dependencies between at least some of the tasks (e.g., a defined order; some tasks depending on the output from other tasks or the completion of other tasks, etc.). If so, the multiple tasks may be performed in various manners (e.g., different devices of the group performing different tasks, such as based on different capabilities of the different devices and/or different availability of the difference devices; each of the devices of the group performing all of the multiple tasks; etc.). Furthermore, the performance of the task by a device of the group may be evaluated based in whole or in part on the performance of the multiple tasks, whether relative to other devices of the group or in combination with the other devices.

The LTG server system may further provide various functionality as part of the described techniques. Such functionality may include tracking locations of devices (e.g., to determine when a device's location may satisfy a task to be performed), providing notifications to particular devices (e.g., notifications related to particular tasks), etc. Such functionality may further include enabling clients of the LTG server system to define or otherwise specify tasks to be performed in various manners, including to optionally specify various types of associated information (e.g., task priority, task location, task completion time deadline, other related tasks and inter-dependencies between the tasks, etc.).

From the foregoing it will also be appreciated that, although specific embodiments have been described herein for purposes of illustration, various modifications may be made without deviating from the spirit and scope of the invention. Accordingly, the invention is not limited by the exemplary details. In addition, while certain aspects of the invention may be now or later presented in certain claim forms, the inventors contemplate the various aspects of the invention in any available claim form. For example, while only some aspects of the invention may be initially recited as being embodied in a computer-readable medium, other aspects may likewise be so embodied. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A smart-mesh socket comprising:
    a bottom cap connector that includes a first Universal Serial Bus (USB) connector;
    a smart-mesh circuit that is electrically coupled to the bottom cap connector and that includes:
        a main circuit with one or more processing units and one or more memory components; and
        multiple wireless circuits that support multiple wireless communication protocols, wherein one or more of the multiple wireless circuits each includes a transceiver to send and receive communications via a mesh network that includes a plurality of smart-mesh sockets and using at least one of a wireless broadband long-term evolution (LTE) communication protocol or a wireless narrow-band internet-of-things (NB-IoT) communication protocol,
        wherein the one or more memory components store software instructions that, when executed by at least one of the one or more processing units, cause the smart-mesh socket to participate in the mesh network and to participate in providing aggregated functionality from the plurality of smart-mesh sockets; and
    a top socket including a second USB connector that is electrically coupled to the bottom cap USB connector.

2. The smart-mesh socket of claim 1 wherein the first USB connector is a USB plug that is sized and shaped to be electrically coupled with a USB receptable, and wherein the second USB connector is a USB receptable that is sized and shaped to receive and be electrically coupled with a USB plug of another device.

3. The smart-mesh socket of claim 1 wherein the second USB connector is a USB plug that is sized and shaped to be electrically coupled with a USB receptable, and wherein the first USB connector is a USB receptable that is sized and shaped to receive and be electrically coupled with an external USB plug.

4. The smart-mesh socket of claim 1 wherein the multiple wireless communication protocols include the wireless broadband LTE protocol and the wireless NB-IoT protocol and at least one of a Wi-Fi protocol, a Bluetooth protocol or a near-field communications (NFC) protocol.

5. The smart-mesh socket of claim 1 wherein the multiple wireless communication protocols include the wireless broadband LTE protocol and the wireless NB-IoT protocol and a Wi-Fi protocol and a Bluetooth protocol and a near-field communications (NFC) protocol.

6. The smart-mesh socket of claim 1 wherein the software instructions stored by the one or more memory components are part of multiple software programs that include at least one operating system program from a group including Android operating system software, ARTOS operating system software, Linux operating system software, and Java virtual machine software, and that further include at least one application software program to provide at least some of the aggregated functionality.

7. The smart-mesh socket of claim 1 further comprising a lower case and a top case, wherein the lower case and the top case fully enclose the smart-mesh circuit when the lower case is engaged with the top case.

8. The smart-mesh socket of claim 7 wherein the top case has one or more visual attributes indicating one or more characteristics of the smart-mesh socket.

9. The smart-mesh socket of claim 1 wherein the plurality of smart-mesh sockets are located within a building, and wherein the participating by the smart-mesh socket in the providing of the aggregate functionality from the plurality of smart-mesh sockets includes at least some of the plurality of smart-mesh sockets being configured to at least one of monitor occupancy of the building or monitor environmental conditions of the building.

10. The smart-mesh socket of claim 1 wherein the plurality of smart-mesh sockets cover a defined area, and wherein the participating by the smart-mesh socket in the providing of the aggregate functionality from the plurality of smart-mesh sockets includes at least some of the plurality of smart-mesh sockets being configured to at least one of provide reservations for spaces within the defined area or provide one or more geo-fences for one or more spaces within the defined area or support administration of electrical devices within the defined area from one or more locations external to the defined area.

11. The smart-mesh socket of claim 1 wherein the participating by the smart-mesh socket in the providing of the aggregate functionality from the plurality of smart-mesh sockets includes the smart-mesh socket being further configured to perform automated operations including:
receiving, over the mesh network, and based at least in part on capabilities of the smart-mesh socket, first instructions to implement a specified type of operation;
performing the specified type of operation and providing information about results of the performing for use in an evaluation of the smart-mesh socket according to one or more specified criteria; and
receiving, over the mesh network, and after the smart-mesh socket is selected to implement additional operations of the specified type based at least in part on the evaluation, one or more second instructions to implement one or more of the additional operations of the specified type.

12. The smart-mesh socket of claim 11 wherein the automated operations further include, before the receiving of the first instructions, providing information to a server system about capabilities of the smart mesh socket for implementing the specified type of operation, and wherein the receiving of the first operations is from the server system as an result of a selection of the smart-mesh socket by the server system that is made based at least in part on the capabilities of the smart-mesh socket.

13. The smart-mesh socket of claim 11 wherein the performing of the specified type of operation includes performing, by the smart-mesh socket, one or more tasks associated with the specified type of operation, and wherein the providing of the information is performed at least in part over at least one network connection between a server system and a host smart-mesh socket of the plurality of smart-mesh sockets that is selected to act as a host device for a group including the plurality of smart-mesh sockets.

14. The smart-mesh socket of claim 13 wherein selecting of the host smart-mesh socket is performed by the plurality of smart-mesh sockets before the receiving of the first instructions and includes selecting one of the plurality other than the smart-mesh socket as the host smart-mesh socket, and wherein the automated operations further include:
determining, during the performing of the one or more tasks and after the at least one network connection becomes unavailable, for the smart-mesh socket to act as a new host device for the group; and
wherein the providing of the information to the server system is performed at least in part over at least one additional network connection created between the server system and the smart-mesh socket.

15. A system with a plurality of smart-mesh sockets, each smart-mesh socket within the plurality comprising:
a bottom cap connector having a Universal Serial Bus (USB) plug that is sized and shaped to be electrically coupled with a USB receptacle; and
a smart-mesh circuit that is electrically coupled to the bottom cap connector and that includes:
a main circuit with one or more processing units and one or more memory components; and
one or more wireless circuits that support multiple wireless communication protocols and that include one or more transceivers to send and receive communications with other smart mesh sockets of the plurality via a mesh network,
wherein the one or more memory components store software instructions that, when executed by at least one of the two or more processing units, cause the smart-mesh socket to participate in the mesh network with the plurality of smart-mesh sockets and to participate in providing functionality distributed across the plurality of smart-mesh sockets via interactions between the plurality of smart-mesh sockets, and wherein the providing of the functionality distributed across the plurality of smart-mesh sockets includes at least some of the plurality of smart-mesh sockets being configured to track a user device as the user device moves within separate areas covered by respective smart-mesh sockets of the mesh network.

16. The system of claim 15 wherein at least some of the plurality of smart mesh sockets each further includes a top socket, electrically coupled to the bottom cap connector of the smart mesh socket, that is sized and shaped to receive and provide power to an electrical device.

17. The system of claim 15 wherein at least some of the plurality of smart mesh sockets each further includes a top socket that is electrically coupled to the bottom cap connector of the smart mesh socket and that has at least one USB receptable sized and shaped to receive and connect with a USB plug of another device.

18. The system of claim 15 wherein the multiple wireless communication protocols include a wireless broadband long-term evolution (LTE) protocol, and wherein the communications sent and received with the other smart mesh sockets of the plurality via the mesh network are performed in at least in part using the wireless broadband LTE protocol.

19. The system of claim 18 wherein the multiple wireless communication protocols further include at least one of a Wi-Fi protocol or a Bluetooth protocol, and wherein the communications sent and received with the other smart mesh sockets of the plurality via the mesh network are performed in part using the at least one of the Wi-Fi protocol or the Bluetooth protocol.

20. The system of claim 15 wherein the multiple wireless communication protocols include a wireless narrow-band internet-of-things (NB-IoT) protocol, and wherein the communications sent and received with the other smart mesh sockets of the plurality via the mesh network are performed in at least in part using the wireless NB-IoT protocol.

21. The system of claim 20 wherein the multiple wireless communication protocols further include at least one of a Wi-Fi protocol or a Bluetooth protocol, and wherein the communications sent and received with the other smart mesh sockets of the plurality via the mesh network are performed in part using the at least one of the Wi-Fi protocol or the Bluetooth protocol.

22. The system of claim 15 wherein the multiple wireless communication protocols include a wireless broadband long-term evolution (LTE) protocol and a wireless narrowband internet-of-things (NB-IoT) protocol, and wherein the communications sent and received with the other smart mesh sockets of the plurality via the mesh network are performed in at least in part using the wireless broadband LTE protocol and using the wireless NB-IoT protocol.

23. The system of claim 15 wherein the plurality of smart-mesh sockets are located within a building, and wherein the providing of the functionality distributed across the plurality of smart-mesh sockets includes at least some of the plurality of smart-mesh sockets being configured to at least one of monitor occupancy of the building or monitor environmental conditions of the building.

24. The system of claim 15 wherein the plurality of smart-mesh sockets cover a defined area, and wherein the providing of the functionality distributed across the plurality of smart-mesh sockets caused by the software instructions includes at least some of the plurality of smart-mesh sockets being configured to at least one of provide reservations for spaces within the defined area or provide one or more geo-fences for one or more spaces within the defined area or support administration of electrical devices within the defined area from one or more locations external to the defined area.

25. The system of claim 15 wherein the providing of the functionality distributed across the plurality of smart-mesh sockets includes one or more of the plurality of smart-mesh sockets being further configured to perform automated operations including:
   receiving information about capabilities of at least some of the plurality of smart-mesh sockets to each implement a specified type of operation;
   sending, over the mesh network, and based at least in part on the capabilities of the at least some smart-mesh sockets, first instructions to the at least some smart-mesh sockets to implement the specified type of operation;
   evaluating performance of each of the at least some smart-mesh sockets in implementing the specified type of operation, including scoring the performance of each of the at least some smart-mesh sockets according to one or more specified criteria;
   selecting one or more smart-mesh sockets of the at least some smart-mesh sockets to implement additional operations of the specified type, wherein the selecting is based at least in part on the evaluated performance of the one or more smart-mesh sockets; and
   sending, based on the selecting, one or more second instructions to each of the one or more smart-mesh sockets to implement one or more of the additional operations of the specified type.

26. The system of claim 25 wherein the selecting of the one or more smart-mesh sockets is further based in part on at least one of information about scheduled maintenance for the one or more smart-mesh sockets or the one or more smart-mesh sockets being in a specified geographical location or workload information indicating current loads of the one or more smart-mesh sockets or past performance scores for the one or more smart-mesh sockets or a priority of a specified task to be performed or a time by which performing of a specified task is to be completed or a group of inter-related tasks to be performed in a specified order.

27. A system with a plurality of smart-mesh sockets, each smart-mesh socket within the plurality comprising:
   a bottom cap connector having a Universal Serial Bus (USB) plug that is sized and shaped to be electrically coupled with a USB receptacle; and
   a smart-mesh circuit that is electrically coupled to the bottom cap connector and that includes:
      a main circuit with one or more processing units and one or more memory components; and
      one or more wireless circuits that support multiple wireless communication protocols and that include one or more transceivers to send and receive communications with other smart mesh sockets of the plurality via a mesh network,
      wherein the one or more memory components store software instructions that, when executed by at least one of the two or more processing units, cause the smart-mesh socket to participate in the mesh network with the plurality of smart-mesh sockets and to participate in providing functionality distributed across the plurality of smart-mesh sockets via interactions between the plurality of smart-mesh sockets, wherein at least some smart-mesh sockets are each associated with a mechanical system and has capabilities to receive and implement instructions to modify operations of the associated mechanical system via a specified type of operation that manipulates an environment around the associated mechanical systems, and wherein the interactions between the plurality of smart-mesh sockets includes sending first instructions to each of the at least some smart-mesh sockets to cause the smart-mesh socket to control the associated mechanical system to perform the specified type of operation.

28. The system of claim 27 wherein the multiple wireless communication protocols include two or more of a wireless broadband long-term evolution (LTE) protocol or a wireless narrow-band internet-of-things (NB-IoT) protocol or a Wi-Fi protocol or a Bluetooth protocol, and wherein the communications sent and received with the other smart mesh sockets of the plurality via the mesh network are performed in at least in part using the multiple wireless communication protocols.

29. A computer-implemented method comprising:
receiving, by at least some smart-mesh sockets from a plurality of smart-mesh sockets participating in a mesh network, instructions to implement one or more specified types of operations in a distributed manner by the at least some smart-mesh sockets; and
providing, by the at least some smart-mesh sockets based at least in part on interactions between the at least some smart-mesh sockets, and in response to the receiving of the instructions, functionality distributed across the at least some smart-mesh sockets to implement the one or more specified types of operations, wherein the providing of the functionality distributed across the at least some smart-mesh sockets includes the at least some smart-mesh sockets being configured to track location of a user device as the user device moves within separate areas covered by respective smart-mesh sockets of the mesh network,
and wherein each of the at least some smart-mesh sockets includes a bottom cap connector having a Universal Serial Bus (USB) plug that is sized and shaped to be electrically coupled with a USB receptacle, and further includes a smart-mesh circuit that is electrically coupled to the bottom cap connector and that has a main circuit with one or more processing units and one or more memory components and that supports multiple wireless communication protocols and that include one or more transceivers to send and receive communications with other smart mesh sockets of the plurality via the mesh network.

30. The computer-implemented method of claim 29 wherein the multiple wireless communication protocols include two or more of a wireless broadband long-term evolution (LTE) protocol or a wireless narrow-band internet-of-things (NB-IoT) protocol or a Wi-Fi protocol or a Bluetooth protocol, and wherein the communications sent and received with the other smart mesh sockets of the plurality via the mesh network are performed in at least in part using the multiple wireless communication protocols.

* * * * *